(12) United States Patent
Herrera, Jr.

(10) Patent No.: US 7,000,970 B1
(45) Date of Patent: Feb. 21, 2006

(54) MOLDED DASHBOARD COVER

(75) Inventor: Frank Herrera, Jr., Corona, CA (US)

(73) Assignee: Nu Image Components, Inc., Corona, CA (US)

( * ) Notice: Subject to any disclaimer, the term of this patent is extended or adjusted under 35 U.S.C. 154(b) by 0 days.

(21) Appl. No.: 10/910,082

(22) Filed: Aug. 2, 2004

(51) Int. Cl.
*B62D 25/14* (2006.01)

(52) U.S. Cl. ....................... 296/70; 296/97.7

(58) Field of Classification Search .......... 296/70, 296/97.7
See application file for complete search history.

(56) References Cited

U.S. PATENT DOCUMENTS

| | | | |
|---|---|---|---|
| 2,070,760 A | | 2/1937 | Straith |
| D271,481 S | | 11/1983 | Sugai |
| 4,449,747 A | * | 5/1984 | Morgan et al. ............. 156/212 |
| 4,508,381 A | | 4/1985 | Herring |
| 4,568,404 A | | 2/1986 | Herring |
| D287,353 S | * | 12/1986 | Cornwell ................... D12/192 |
| D287,354 S | * | 12/1986 | Cornwell ................... D12/192 |
| D287,355 S | * | 12/1986 | Cornwell ................... D12/192 |
| D287,356 S | * | 12/1986 | Cornwell ................... D12/192 |
| D288,430 S | * | 2/1987 | Cornwell ................... D12/192 |
| 4,708,388 A | * | 11/1987 | Zacharczuk ................ 296/97.7 |
| 5,156,433 A | | 10/1992 | Decker |
| 5,687,989 A | * | 11/1997 | Maesing et al. ......... 280/728.2 |
| D488,416 S | * | 4/2004 | Herrera, Jr. ............... D12/192 |
| D488,417 S | * | 4/2004 | Herrera, Jr. ............... D12/192 |
| 6,908,521 B1 | * | 6/2005 | Ponthieu .................... 156/73.5 |

FOREIGN PATENT DOCUMENTS

| | | | |
|---|---|---|---|
| DE | 4214662 A1 | * | 11/1993 |
| DE | 19823048 A1 | * | 11/1998 |
| FR | 2800338 | * | 5/2001 |

* cited by examiner

*Primary Examiner*—Kiran B. Patel
(74) *Attorney, Agent, or Firm*—Thomas I. Rozsa; Tony D. Chen

(57) ABSTRACT

A molded dashboard cover formed from plastic, fiberglass, polypropylene or related synthetic materials to give the dashboard of a vehicle a smooth appearance or an ornate appearance. The molded dashboard cover is retained in place on the vehicle dashboard by a front lip which is press fit between the front upper surface of the dashboard and the interior surface of the windshield and an interior rear lip which is press fit between the rear of the dashboard and the facie cover of the instrument panel. Openings in the molded dashboard cover accommodate the instrument panel, the glove box and the heating and air conditioning vents.

20 Claims, 2 Drawing Sheets

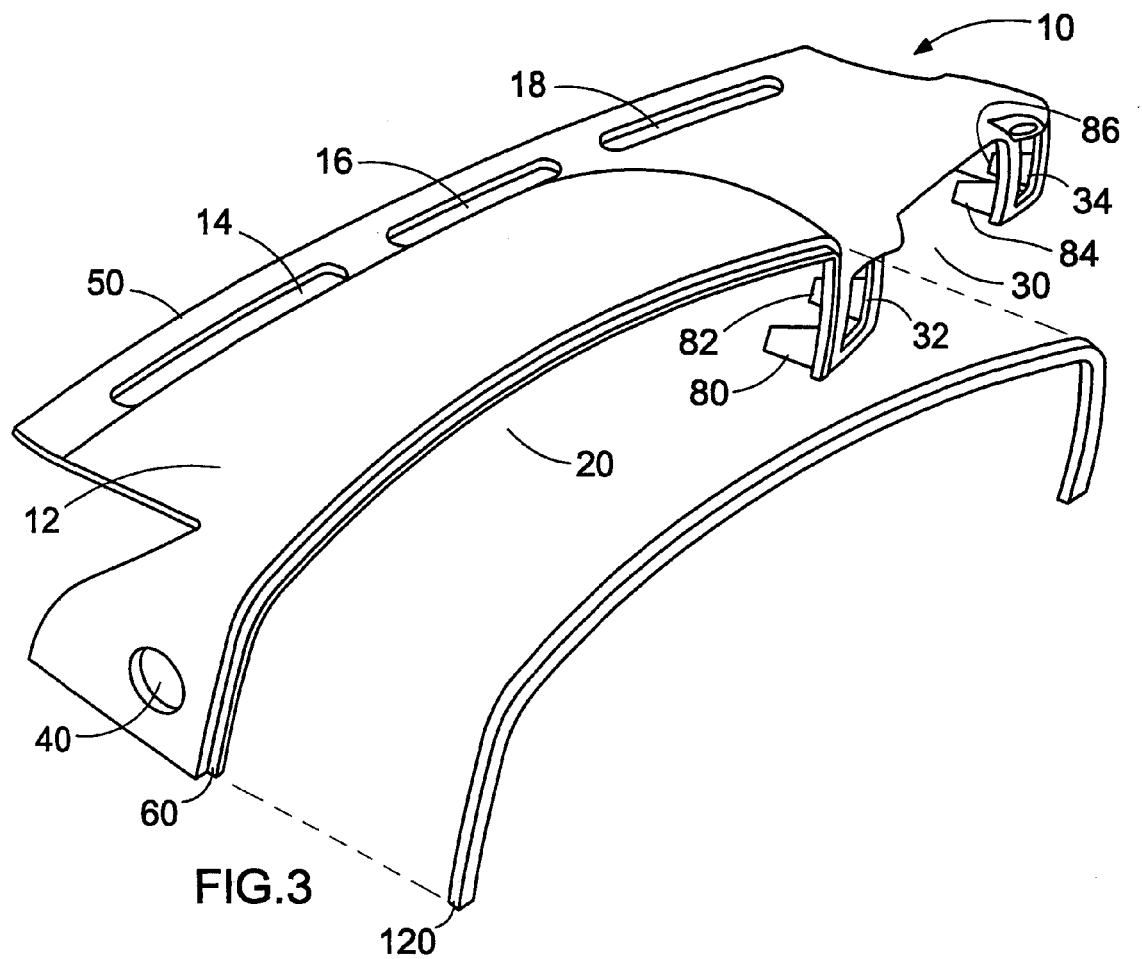
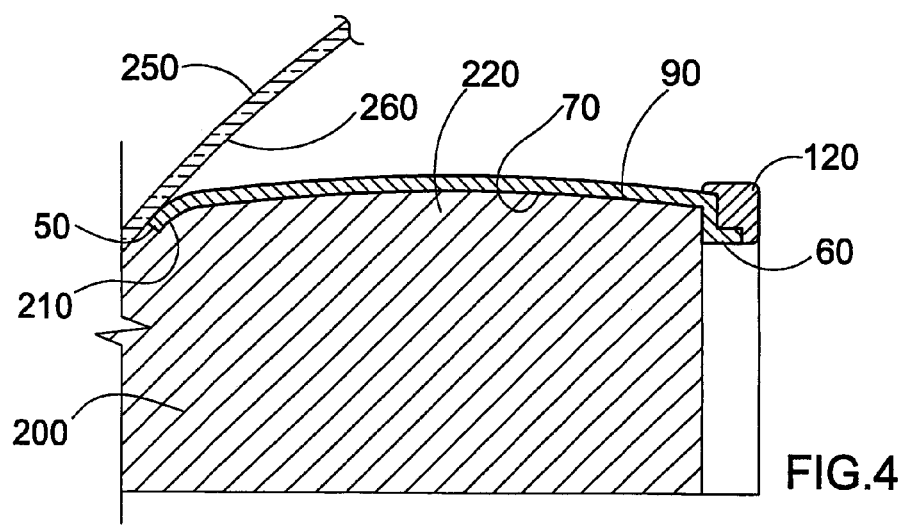

MOLDED DASHBOARD COVER

BACKGROUND OF THE INVENTION

1. Field of the Invention

The present invention relates to the field of covers for the dashboard of a vehicle such as trucks, sport utility vehicles and cars which both protect the dashboard and provide an aesthetic appearance to the dashboard.

2. Description of the Prior Art

In general, covers for the dashboard of a vehicle are known. The following eleven (11) patents are representative of the dashboard covers which are known in the prior art.

1. U.S. Pat. No. 2,070,760 issued to Straith on Feb. 16, 1937 for "Safety Device For Automobiles" (hereafter the "Straith Patent");

2. U.S. Pat. No. Des. 271,481 issued to Sugai on Nov. 22, 1983 for "Mat For An Automotive Dashboard" (hereafter the "Sugai Patent");

3. U.S. Pat. No. 4,508,381 issued to Herring on Apr. 2, 1985 for "Snap-On Plastic Cover For Sun-Damaged Vinyl Covered Dashboard Pads And Method Of Making" (hereafter the "'381 Herring Patent");

4. U.S. Pat. No. 4,568,404 issued to Herring on Feb. 4, 1986 for "Method Of Making Snap-on Plastic Cover For Sun-Damaged Vinyl-Covered Dashboard Pads" (hereafter the "'404 Herring Patent");

5. U.S. Pat. No. Des. 287,353 issued to Cornwell on Dec. 23, 1986 for "Dashboard Cover" (hereafter the "'353 Cornwell Patent");

6. U.S. Pat. No. Des. 287,354 issued to Cornwell on Dec. 23, 1986 for "Dashboard Cover" (hereafter the "'354 Cornwell Patent");

7. U.S. Pat. No. Des. 287,356 issued to Cornwell on Dec. 23, 1986 for "Dashboard Cover" (hereafter the "'356 Cornwell Patent");

8. U.S. Pat. No. Des. 288,430 issued to Cornwell on Feb. 24, 1987 for "Dashboard Cover" (hereafter the "'430 Cornwell Patent");

9. U.S. Pat. No. 4,708,388 issued to Zacharczuk on Nov. 24, 1987 for "Dashboard Cover" (hereafter the "Zacharczuk Patent");

10. U.S. Pat. No. 5,156,433 issued to Decker on Oct. 20, 1992 for "Combination Windshield-Screen Dashboard-Mat Device" (hereafter the "Decker Patent");

11. U.S. Pat. No. 5,234,246 issued to Henigue on Aug. 10, 1993 for "Dashboard" (hereafter the "Henigue Patent").

The Sugai Patent which issued in 1983 is a design patent which is a mat for an automotive dashboard. It is designed to accommodate various shapes of the automotive instrument panel that were present at that time.

Cornwell had a series of four design patents. An examination of the '353 Cornwell Patent Dashboard Cover shows that it does have the opening for the instrument panel and also for a glove box without being firmly retained in place. It appears to just be laid over the dashboard without being firmly retained in place.

Similarly, the '354 Cornwell Patent also shows the concept of a dashboard that appears to just be laid over the dashboard without items to press fit and retain it but also has the various vents for the air conditioning and heating and the instrument panel.

The '356 Cornwell Patent is a dashboard cover which once again has openings for the instrument panel and glove box and appears to just lay over the dashboard.

Finally, the '430 Cornwell Patent is also a dashboard cover having openings for a different configuration of instrument panel and air conditioning ducts and vents for the heating and air conditioning in the dashboard but no specific way to retain it so it apparently just lies over the dashboard.

The Straith Patent is a safety device for automobiles. It involves a compressible or cushioning member which is arranged to be secured to the instrument panel either permanently or detachably as best illustrated in FIG. 1 so that in the event of a collision, the person is cushioned by the compressible member.

The '381 Herring Patent is a snap-on plastic cover for sun-damaged vinyl covered dashboards. The '381 Herring Patent is the apparatus patent and the '404 Herring Patent is the method patent which is a divisional of the earlier '381 apparatus patent. They both have the same disclosure but relate to different claims.

With respect to the '381 Herring Patent, FIG. 3 shows a sectional view illustrating the snap-on cover installed on a pre-existing dashboard cover of an automobile.

Referring to Column 3, starting on Line 26, the patent states "After application of suitable glue on the inner surface of the snap-on cover and on the surface of the dashboard pad, the snap-on cover is simply 'snapped' onto the dashboard pad by first positioning the rearward portion of the snap-on cover in proper alignment with the rearward portion of the dashboard cover and then sliding the forward backdraft portion of the snap-on cover over the forward peripheral portions of the dashboard pad, any additional fracturing or breaking being confined to the forward corner peripheral back draft portions of the snap-on cover, where they will be mostly hidden from view."

Referring to Column 6 beginning on Line 37 the patent states "After the peripheral skirt portion 9C (FIG. 2G) has been completed, the unit is ready for installation on a sun-damaged dashboard pad such as 49 in FIG. 3. By applying glue to the under surface of snap-on cover 9, mainly for the purpose of preventing it from rattling as a result of being buffeted by wind currents from vent openings or through windows of the automobile, snap-on cover 9 is simply aligned over dashboard pad 49, its rearward back draft portion 9E is positioned under corresponding portion 49A of dashboard pad 49, and the forward back draft portion 9D is forced downward and 'snapped' over the forward edge portions 49C and 49B of dashboard pad 49." The windshield is 47. The dashboard cover is therefore retained in placed with adhesive.

The Zacharczuk Patent is a foldable dashboard shield for use in screening the dashboard of a motor vehicle which is formed of a thin sheet of cardboard like material or one of the rigid polymers. It is scribed with fold lines so that it can be folded over as illustrated. It is essentially a sun shield for use for covering a dashboard.

The Decker Patent has as its novel feature a combination windshield-screen dashboard-mat device. Its innovative feature is that it functions as a cover for a dashboard and also as a window screen and sunshade.

Finally, the Henigue Patent is a dashboard. This patent has a removably attached cover 20 which fixes approximately the exterior shape of the dashboard and finally, a removably attached lining 30 which matches the cover 20 and defines the appearance of the dashboard.

Therefore, it is highly desirable to have an improved dashboard cover which provides either a smooth or an ornate covering to the dashboard and is held in place by the design of the dashboard cover.

SUMMARY OF THE INVENTION

The present invention is a molded dashboard cover which is molded out of material which gives the dashboard cover a smooth surface or alternatively, an ornately designed surface, so that the vehicle dashboard is given a unique smooth surface or ornate surface appearance.

It has been discovered, according to the present invention, that if the molded dashboard cover is molded out of material such as plastic, fiberglass, polypropylene or related synthetic materials, then the dashboard cover can be molded with a smooth upper surface to give the vehicle dashboard a smooth appearance or can be molded with an ornate design to give the vehicle dashboard an ornate appearance.

It has also been discovered, according to the present invention, that if the molded dashboard cover is formed with a front lip that extends for the entire length of the molded dashboard cover, then the front lip can be press fit between the upper front surface of the dashboard and the interior surface of the windshield to securely retain the molded dashboard cover in place on the dashboard.

It has further been discovered, according to the present invention, that if the rear of the molded dashboard cover facing the passenger compartment of the vehicle has an interim lip surrounding the periphery of the instrument panel, then the facie cover of the instrument panel can be removed and placed over the interior lip and cause the interior lip to be pressed and retained between the dashboard and the facie cover to thereby further retain the instrument panel on the dashboard.

It has also been discovered, according to the present invention, that if the dashboard cover has tabs which face the front of the dashboard, then the tabs can be pressed into areas of the dashboard that have small gaps, thus creating a tight fit in the gap area and further assisting in retaining the dashboard cover on the dashboard.

It has additionally been discovered, according to the present invention, that if the molded dashboard cover has openings to accommodate the instrument panel, glove box, heating vents and air conditioning vents, then the molded dashboard cover will not interfere with the normal operation of the vehicle.

It is therefore an object of the present invention to provide a molded dashboard cover which will provide a smooth or ornate appearance on a vehicle dashboard.

It is another object of the present invention to provide a molded dashboard cover which comprises means by which the molded dashboard cover may be retained on the vehicle dashboard.

It is a further object of the present invention to provide a molded dashboard cover which will not interfere with the normal operation of the vehicle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is an exploded perspective view of the present invention molded dashboard cover removed from the dashboard of a vehicle with the facie from the instrument panel removed to expose the retaining lip on the front of the molded dashboard cover; and FIG. 4 is a cross-sectional view showing how the present invention molded dashboard cover is retained on the dashboard of a vehicle.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a molded dashboard cover which can have a smooth upper surface to give the dashboard a smooth appearance or it can have various designs such as flames molded into it to give the dashboard an ornate appearance. The uniqueness of the present invention dashboard cover is the way it is retained in place on the vehicle dashboard. The front part of the dashboard cover has a front lip which tucks into the area between the windshield and the front of the dashboard so that it is press fit and retained in place at the location between the windshield and the portion of the dashboard adjacent the windshield. The rear of the molded dashboard cover at the location of the instrument panel has a lip. When installing the molded dashboard cover, the front facie from the instrument panel is removed and after the molded dashboard cover is set in place over the dashboard, the front facie from the instrument panel is set over the lip and screwed back in place so that the front facie holds the lip and the molded dash board cover in place. The molded dashboard cover has one or more tabs which press fit into gaps in the front of the dashboard to further retain the molded dashboard cover in place on the dashboard.

Figure 1:
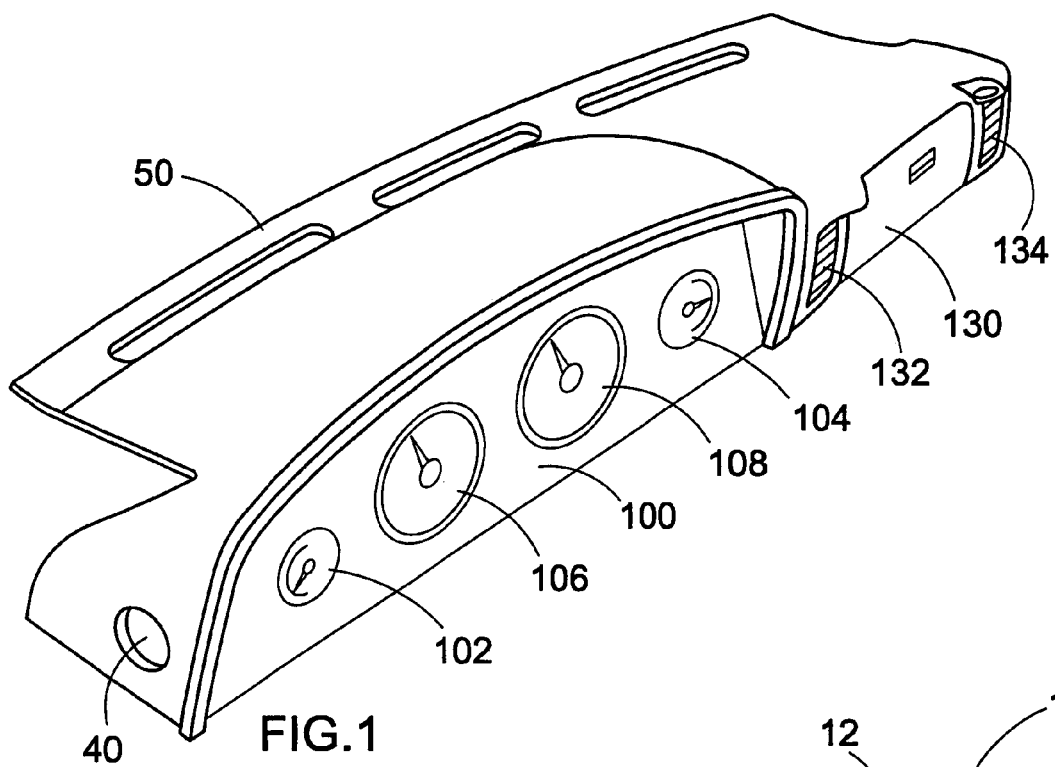
FIG. 1 is a perspective view of the present invention molded dashboard cover in place on the dashboard of a vehicle.
Figure 2:
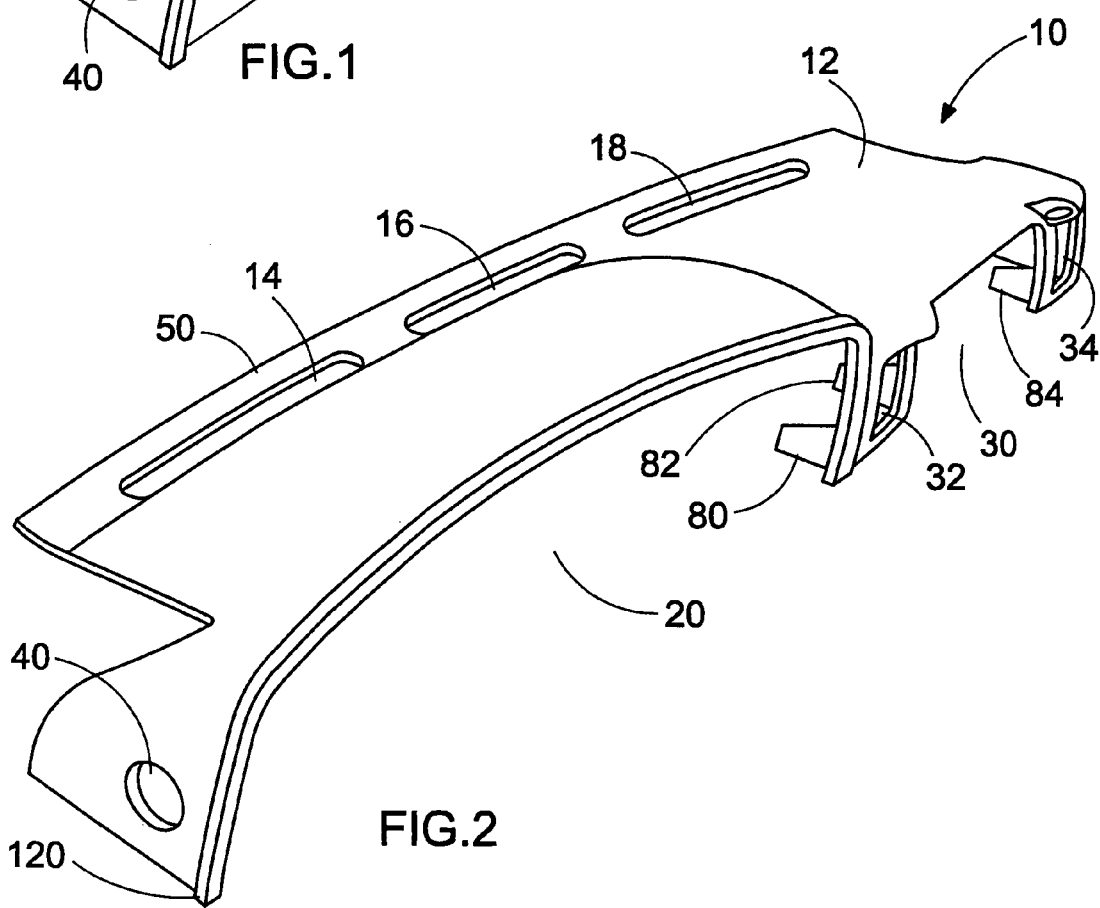
FIG. 2 is a perspective view of the present invention molded dashboard cover removed from the dashboard of a vehicle with the facie from the instrument panel in place on the dashboard cover.

The present invention molded dashboard cover is illustrated in FIGS. 1 through 4. The molded dashboard cover 10 is molded from material such as plastic, fiberglass, polypropylene or related synthetic materials so that preferably its upper surface 12 has a smooth finish to give the vehicle dashboard an attractive covering with a smooth surface as opposed to having a rough textured surface commonly found on most vehicle dashboards. Alternatively, ornate designs such as flames can be molded into the upper surface 12 to provide a dashboard with an ornate look.

The molded dashboard cover 10 further comprises a multiplicity of openings 14, 16 and 18 to accommodate heat vents in the dashboard. The molded dashboard cover 10 also comprises a large opening 20 so that the instrument panel 100 and the various gauges 102 and 104 and speedometers 106 and 108 may be viewed and not obstructed by the molded dashboard cover 10. The molded dashboard cover also has a smaller opening 30 to accommodate the glove box 130 of the vehicle. The molded dashboard cover 10 also has molded openings 32 and 34 to accommodate the air conditioning vents 132 and 134 of the vehicle. The molded dashboard cover 10 may also have one or more side holes of which one 40 is illustrated to accommodate heating or air conditioning vents on the side of the dashboard.

In addition to having the smooth upper surface 12 and the various openings to accommodate the heating and air conditioning vents as discussed and to accommodate the instrument panel and glove box as discussed, the key unique features of the present invention molded dashboard cover 10 which enable it to remain firmly in place on the dashboard 200 is best illustrated in FIGS. 3 and 4. The molded dashboard cover 10 has a front lip 50 which is configured so that it is press fit between the front upper surface 240 of dashboard 200 and the interior surface 260 of windshield 250. The front lip 50 extends for the entire length of the molded dashboard cover 10 so that it is press fit between the front upper surface 210 of dashboard 200 and the interior surface 260 of windshield 250 for the entire length of the dashboard 200 and the entire interior length of the windshield 250 so that the molded dashboard cover 10 is retained securely in place on the dashboard 200.

The rear of the molded dashboard cover 10 which faces the passenger compartment of the vehicle is retained in place by an interior lip 60 which fits underneath and is retained by the facie cover 120 of the instrument panel 100. The interior lip 60 extends for the entire side and upper circumference of the facie cover 120. Prior to installing the molded dashboard cover 10 on the dashboard 200, the facie cover 120 is removed from the instrument panel 100. The molded dashboard cover 10 is then placed over the dashboard 200 and the front lip 50 is securely wedged between the interior upper surface 210 of the dashboard 200 and the interior surface 260 of the windshield 250. The facie cover 120 is put back in place over the instrument panel 100 and is fit over the interior lip 60 so that the interior lip 60 is pressed between the dashboard 200 and the facie cover 120 to thereby hold the rear of the molded dashboard cover 10 in place. The facie cover 120 is then reaffixed to the instrument panel. Therefore, by means of the unique front lip 50 and the rear instrument panel lip 60, the molded dashboard cover is firmly held in place on the dashboard and will not rattle or move.

An additional optional feature to help retain the dashboard cover 10 in place is one or more molded tabs of which tabs 80, 82 and 84 are illustrated. The tabs 80, 82, 84 and 86 are molded to the vertical front of the dashboard cover and extend forwardly so they face the front of the dashboard 200. These tabs 80, 82, 84 and 86 are used to make the dashboard cover 10 fit on snugly and assist in holding the dashboard cover in place on the dashboard 200. These tabs 80, 82 and 84 work by the tabs being pressed into areas of the dashboard that have small gaps thus creating a tight fit in the gap areas. These tabs can be added to any part of the dashboard cover 10 that corresponds with gaps in the dashboard 200. The tabs can also be made with a lip or another type of grip mechanism to further assist in retaining the dashboard cover 10 on the dashboard 200.

To further assure that the molded dashboard cover 10 will remain in place on the dashboard 200, adhesive means 90 can be placed between the inferior surface 70 of the molded dashboard cover 10 and the upper surface 220 of the dashboard 200. By way of example, the adhesive means 90 can be glue or double sided tape.

Defined in detail, the present invention is a vehicle dashboard cover comprising: (a) a one piece molded cover having a smooth upper surface, openings to accommodate an instrument panel, a glove box, heating vents and air conditioning vents of a vehicle; (b) a front lip extending for the entire length of the dashboard cover which is press fit between an interior surface of the vehicle windshield and a front upper surface of a vehicle dashboard; (c) a rear interior lip surrounding a portion of an instrument panel of a vehicle and retained between the dashboard and a facie cover of the instrument panel; and (d) a multiplicity of tabs which are respectively inserted into corresponding gaps in the dashboard.

Defined broadly, the present invention is a vehicle dashboard cover comprising: (a) a one piece molded cover having an ornate upper surface, openings to accommodate an instrument panel, a glove box, heating vents and air conditioning vents of a vehicle; (b) a front lip extending for the entire length of the dashboard cover which is press fit between an interior surface of the vehicle windshield and a front upper surface of a vehicle dashboard; (c) a rear interior lip surrounding a portion of an instrument panel of a vehicle and retained between the dashboard and a facie cover of the instrument panel; and (d) a multiplicity of tabs which are respectively inserted into corresponding gaps in the dashboard.

Defined more broadly, the present invention is a vehicle dashboard cover comprising: (a) a one piece molded cover having a smooth upper surface; (b) a front lip extending for the entire length of the dashboard cover which is press fit between an interior surface of the vehicle windshield and a front upper surface of a vehicle dashboard; and (c) a rear interior lip surrounding a portion of an instrument panel of a vehicle and retained between the dashboard and a facie cover of the instrument panel.

Defined even more broadly, the present invention is vehicle dashboard cover comprising: (a) a one piece molded cover having an ornate upper surface; (b) a front lip extending for the entire length of the dashboard cover which is press fit between an interior surface of the vehicle windshield and a front upper surface of a vehicle dashboard; and (c) a rear interior lip surrounding a portion of an instrument panel of a vehicle and retained between the dashboard and a facie cover of the instrument panel.

Defined even more broadly, the present invention is a vehicle dashboard cover comprising: (a) one piece molded cover having a smooth upper surface; and (b) front lip extending for the entire length of the dashboard cover which is press fit between an interior surface of the vehicle windshield and a front upper surface of a vehicle dashboard.

Defined even more broadly, the present invention is a vehicle dashboard cover comprising: (a) one piece molded cover having an ornate upper surface; and (b) front lip extending for the entire length of the dashboard cover which is press fit between an interior surface of the vehicle windshield and a front upper surface of a vehicle dashboard.

Defined even more broadly, the present invention is a vehicle dashboard cover comprising: (a) one piece molded cover having a smooth upper surface; and (b) a rear interior lip surrounding a portion of an instrument panel of vehicle and retained between the dashboard and a facie cover of the instrument panel.

Defined even more broadly, the present invention is a vehicle dashboard cover comprising: (a) one piece molded cover having an ornate upper surface; and (b) a rear interior lip surrounding a portion of an instrument panel of vehicle and retained between the dashboard and a facie cover of the instrument panel.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A vehicle dashboard cover comprising:
   a. a one piece molded cover having a smooth upper surface, openings to accommodate an instrument panel, a glove box, heating vents and air conditioning vents of a vehicle;
   b. a front lip extending for the entire length of the dashboard cover which is press fit between an interior surface of the vehicle windshield and a front upper surface of a vehicle dashboard;
   c. a rear interior lip surrounding a portion of an instrument panel of a vehicle and retained between the dashboard and a facie cover of the instrument panel; and
   d. a multiplicity of tabs which are respectively inserted into corresponding gaps in the dashboard.

2. A vehicle dashboard cover in accordance with claim 1, further comprising adhesive means between an interior surface of the dashboard cover and an upper surface of the dashboard.

3. A vehicle dashboard cover in accordance with claim 1, wherein the dashboard cover is molded from a group of materials comprising plastic, fiberglass or polypropylene.

4. A vehicle dashboard cover comprising:
   a. a one piece molded cover having an ornate upper surface, openings to accommodate an instrument panel, a glove box, heating vents and air conditioning vents of a vehicle;
   b. a front lip extending for the entire length of the dashboard cover which is press fit between an interior surface of the vehicle windshield and a front upper surface of a vehicle dashboard;
   c. a rear interior lip surrounding a portion of an instrument panel of a vehicle and retained between the dashboard and a facie cover of the instrument panel; and
   d. a multiplicity of tabs which are respectively inserted into corresponding gaps in the dashboard.

5. A vehicle dashboard cover in accordance with claim 3, further comprising adhesive means between an interior surface of the dashboard cover and an upper surface of the dashboard.

6. A vehicle dashboard cover in accordance with claim 3, wherein the dashboard cover is molded from a group of materials comprising plastic, fiberglass or polypropylene.

7. A vehicle dashboard cover comprising:
   a. a one piece molded cover having a smooth upper surface;
   b. a front lip extending for the entire length of the dashboard cover which is press fit between an interior surface of the vehicle windshield and a front upper surface of a vehicle dashboard; and
   c. a rear interior lip surrounding a portion of an instrument panel of a vehicle and retained between the dashboard and a facie cover of the instrument panel.

8. A vehicle dashboard cover in accordance with claim 7, further comprising adhesive means between an interior surface of the dashboard cover and an upper surface of the dashboard.

9. A vehicle dashboard cover in accordance with claim 7, wherein the dashboard cover is molded from a group of materials comprising plastic, fiberglass or polypropylene.

10. A vehicle dashboard cover comprising:
    a. a one piece molded cover having an ornate upper surface;
    b. a front lip extending for the entire length of the dashboard cover which is press fit between an interior surface of the vehicle windshield and a front upper surface of a vehicle dashboard; and
    c. a rear interior lip surrounding a portion of an instrument panel of a vehicle and retained between the dashboard and a facie cover of the instrument panel.

11. A vehicle dashboard cover in accordance with claim 10, further comprising adhesive means between an interior surface of the dashboard cover and an upper surface of the dashboard.

12. A vehicle dashboard cover in accordance with claim 10, wherein the dashboard cover is molded from a group of materials comprising plastic, fiberglass or polypropylene.

13. A vehicle dashboard cover comprising:
    a. one piece molded cover having a smooth upper surface; and
    b. front lip extending for the entire length of the dashboard cover which is press fit between an interior surface of the vehicle windshield and a front upper surface of a vehicle dashboard.

14. A vehicle dashboard cover in accordance with claim 13, wherein the dashboard cover is molded from a group of materials comprising plastic, fiberglass or polypropylene.

15. A vehicle dashboard cover comprising:
    a. one piece molded cover having an ornate upper surface; and
    b. front lip extending for the entire length of the dashboard cover which is press fit between an interior surface of the vehicle windshield and a front upper surface of a vehicle dashboard.

16. A vehicle dashboard cover in accordance with claim 15, wherein the dashboard cover is molded from a group of materials comprising plastic, fiberglass or polypropylene.

17. A vehicle dashboard cover comprising:
    a. one piece molded cover having an ornate upper surface; and
    b. a rear interior lip surrounding a portion of an instrument panel of vehicle and retained between the dashboard and a facie cover of the instrument panel.

18. A vehicle dashboard cover in accordance with claim 17, wherein the dashboard cover is molded from a group of materials comprising plastic, fiberglass or polypropylene.

19. A vehicle dashboard cover comprising:
    a. one piece molded cover having an ornate upper surface; and
    b. a rear interior lip surrounding a portion of an instrument panel of vehicle and retained between the dashboard and a facie cover of the instrument panel.

20. A vehicle dashboard cover in accordance with claim 19, wherein the dashboard cover is molded from a group of materials comprising plastic, fiberglass or polypropylene.

* * * * *